US011254530B2

(12) United States Patent
Oshiro

(10) Patent No.: US 11,254,530 B2
(45) Date of Patent: Feb. 22, 2022

(54) SHEET ALIGNING MECHANISM

(71) Applicant: TOSHIBA TEC KABUSHIKI KAISHA, Tokyo (JP)

(72) Inventor: Toshiaki Oshiro, Izu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 342 days.

(21) Appl. No.: 16/364,765

(22) Filed: Mar. 26, 2019

(65) Prior Publication Data

US 2020/0307933 A1  Oct. 1, 2020

(51) Int. Cl.
*B65H 5/06* (2006.01)
*H04N 1/00* (2006.01)

(52) U.S. Cl.
CPC .......... *B65H 5/062* (2013.01); *H04N 1/0066* (2013.01); *H04N 1/00602* (2013.01)

(58) Field of Classification Search
CPC ............ H04N 1/00602; H04N 1/0066; B65H 2511/214; B65H 2511/13; B65H 2404/262; B65H 2404/5311; B65H 2404/2693; B65H 5/023; B65H 2801/06; B65H 2801/27; B65H 2701/11234; B65H 2701/1916; B65H 9/006; B65H 9/008; B65H 5/36; B65H 2801/03
USPC ....................................................... 358/498
See application file for complete search history.

(56) References Cited

U.S. PATENT DOCUMENTS

| | | | |
|---|---|---|---|
| 7,621,528 B2 * | 11/2009 | Hara ...................... | B65H 5/062 271/273 |
| 8,429,023 B2 * | 4/2013 | Swallow ............ | G06Q 30/0601 705/26.3 |
| 9,304,462 B2 * | 4/2016 | Chiyoda .............. | G03G 15/206 |
| 9,348,290 B2 * | 5/2016 | Oomoto ............. | G03G 15/6529 |
| 10,185,263 B2 * | 1/2019 | Hayashi ............... | G03G 21/206 |
| 2008/0054553 A1 * | 3/2008 | Muneyasu ............. | B65H 9/004 271/240 |
| 2014/0255056 A1 * | 9/2014 | Katayama .......... | G03G 15/6585 399/85 |
| 2019/0241384 A1 * | 8/2019 | Terao ....................... | B65H 7/10 |
| 2020/0039776 A1 * | 2/2020 | Saito ...................... | B65H 9/002 |

FOREIGN PATENT DOCUMENTS

JP           H11-102130 A     4/1999

* cited by examiner

*Primary Examiner* — Negussie Worku
(74) *Attorney, Agent, or Firm* — Kim & Stewart LLP

(57) ABSTRACT

A sheet aligning mechanism includes first and second conveyance mechanisms disposed on first and second sides of a sheet conveyance path, respectively. A nip is formed between the first and second conveyance mechanisms. The first conveyance mechanism includes a first roller, a second roller, and a first conveyance belt wound around the first and second rollers. The first and second rollers are configured to rotate in a first direction along a sheet conveying direction for sheet conveyance, and stop rotation or rotate in a second direction opposite to the first direction for sheet alignment. The first conveyance belt includes an extended region between the first and second rollers in an extending direction inclined with respect to the sheet conveying direction, such that a width of the sheet conveyance path becomes narrower towards the nip in the sheet conveying direction.

20 Claims, 8 Drawing Sheets

SHEET ALIGNING MECHANISM

FIELD

Embodiments described herein relate generally to a sheet aligning mechanism and an image forming apparatus.

BACKGROUND

An image forming apparatus includes a sheet aligning mechanism for correcting an inclination of a sheet. The sheet aligning mechanism aligns the sheet to correct the inclination of the sheet by causing a leading end of the sheet to be aligned with a nip of rollers (aligning rollers). The sheet aligning mechanism conveys the sheet by driving the rollers after aligning.

However, when the sheet is too thick, the sheet aligning mechanism may not properly convey the sheet after aligning.

DETAILED DESCRIPTION

Figure 1:
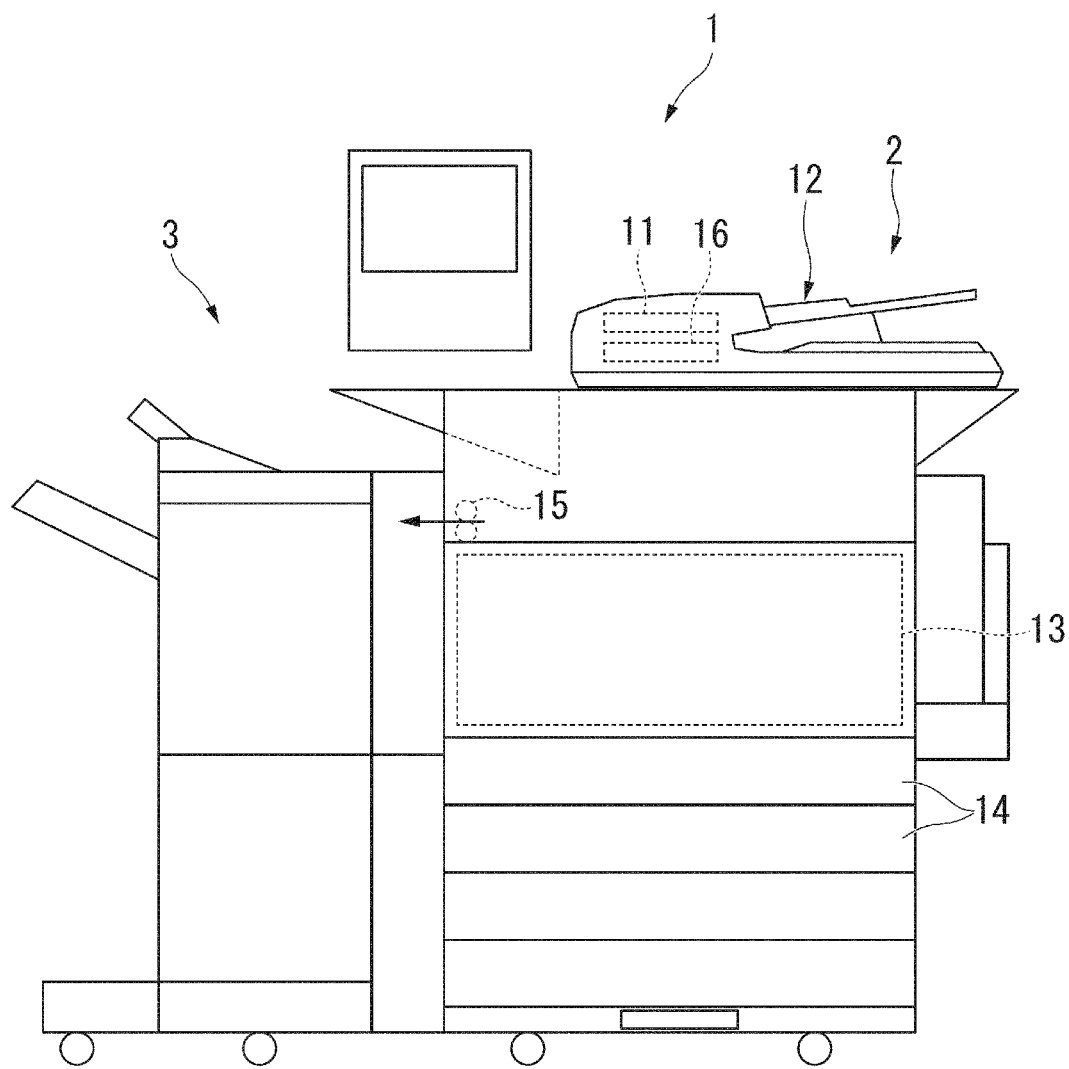
FIG. 1 illustrates an overview of an image forming system including an image forming apparatus according to an embodiment.

In general, according to an embodiment, a sheet aligning mechanism includes a first conveyance mechanism disposed on a first side of a sheet conveyance path and a second conveyance mechanism disposed on a second side of the sheet conveyance path opposite to the first side. A nip is formed between the first and second conveyance mechanisms. The first conveyance mechanism includes a first roller, a second roller, and a first conveyance belt wound around the first and second rollers. The first and second rollers are configured to rotate in a first direction along a sheet conveying direction for sheet conveyance, and stop rotation or rotate in a second direction opposite to the first direction for sheet alignment. The first conveyance belt includes an extended region between the first and second rollers inclined in an extending direction with respect to the sheet conveying direction, such that a width of the sheet conveyance path becomes narrower towards the nip in the sheet conveying direction.

Hereinafter, a sheet aligning mechanism and an image forming apparatus according to an embodiment will be described with reference to the drawings. In each drawing, the same reference numerals are used for the same components. In each drawing, a dimension and a shape of each element may be exaggerated or simplified for easy understanding.

FIG. 1 illustrates an overview of an example of an image forming system 1. As illustrated in FIG. 1, the image forming system 1 includes an image forming apparatus 2 and a post-processing apparatus 3. The image forming apparatus 2 forms an image on a sheet. The post-processing apparatus 3 performs post-processing on the sheet conveyed from the image forming apparatus 2.

The image forming apparatus 2 includes a control panel 11, a scanner unit 12, a printer unit 13, a paper feed unit 14, a paper discharge unit 15, and an image forming control unit 16.

The control panel 11 includes various keys to receive an operation of a user. For example, the control panel 11 receives an input related to a type of post-processing of a sheet. The control panel 11 transmits information regarding the type of the post-processing to the post-processing apparatus 3.

The scanner unit 12 includes a reading unit to obtain image information of an object to be copied. The scanner unit 12 transmits the image information to the printer unit 13.

The printer unit 13 forms an output image (hereinafter, referred to as a "toner image") by using developer such as toner, based on the image information transmitted from the scanner unit 12 or an external device. The printer unit 13 transfers the toner image on a surface of the sheet. The printer unit 13 fixes the toner image onto the sheet by applying heat and pressure on the toner image transferred on the sheet.

The paper feed unit 14 supplies sheets to the printer unit 13 one by one (or one copy) according to a timing when the printer unit 13 forms the toner image.

The paper discharge unit 15 conveys the sheet discharged from the printer unit 13 to the post-processing apparatus 3.

The image forming control unit 16 controls an overall operation of the image forming apparatus 2. That is, the image forming control unit 16 controls the control panel 11, the scanner unit 12, the printer unit 13, the paper feed unit 14, and the paper discharge unit 15. The image forming control unit 16 may be formed of a control circuit including a CPU, a ROM, and a RAM.

The post-processing apparatus 3 is disposed adjacent to the image forming apparatus 2. The post-processing apparatus 3 executes post-processing specified through the control panel 11, on the sheet conveyed from the image forming apparatus 2. For example, the post-processing is stapling or sorting.

Figure 2:
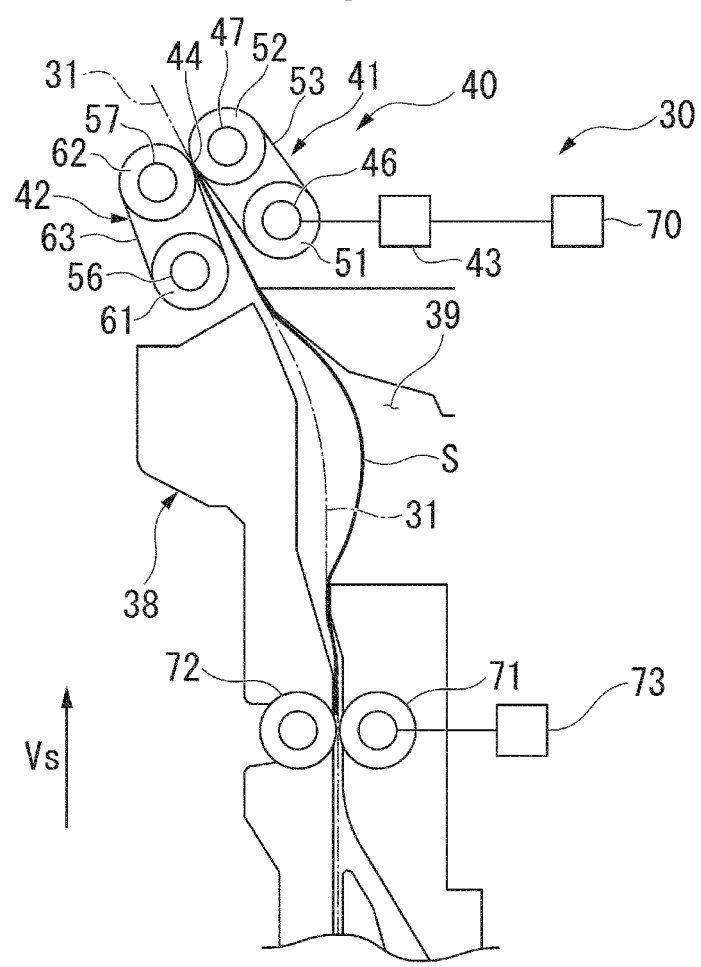
FIG. 2 illustrates a schematic side view of a conveyance unit including a sheet aligning mechanism.

Hereinafter, a conveyance unit will be described. FIG. 2 illustrates a schematic side view of a conveyance unit 30. As illustrated in FIG. 1, the image forming apparatus 2 includes the conveyance unit 30 (conveyance device, see FIG. 2). The image forming apparatus 2 includes a conveyance path 31 (see FIG. 2) for conveying a sheet S.

The sheet S (object to be conveyed) maybe one sheet (for example, normal paper), or may be a layered body in which a plurality of sheets overlap one another. The layered body may include a sealed letter, a clear file, an envelope, a label seal, or the like. For example, the layered body is formed by folding one or more sheets. For example, the sealed letter includes an envelope and one or more sheets put into the envelope.

As illustrated in FIG. 2, the conveyance unit 30 includes a conveyance path forming unit 38, a sheet aligning mechanism 40, and a pair of conveyance rollers 71 and 72. The sheet S is conveyed substantially from the bottom to the top along the conveyance path 31. The sheet S is conveyed from the paper feed unit 14 (for example, a paper feed cassette) to the printer unit 13 (for example, an image forming unit) through the conveyance unit 30 (see FIG. 1). The side of the paper feed unit 14 (lower side in the paper face of FIG. 2) in a conveyance direction Vs of the sheet S is referred to as an "upstream side." The side of the printer unit 13 (upper side in the paper face of FIG. 2) in the conveyance direction Vs is referred to as a "downstream side." A direction V1 (a depth direction in the paper face of FIG. 2) perpendicular to the conveyance direction Vs in the surface of the sheet S conveyed along the conveyance path 31 is referred to as a "conveyance perpendicular direction V1" (see FIG. 3).

The conveyance path forming unit 38 forms the conveyance path 31 between the paper feed unit 14 (see FIG. 1) and the printer unit 13 (see FIG. 1). The conveyance path forming unit 38 forms a bending space 39 of the sheet S on the upstream side of a pair of conveyance mechanisms 41 and 42. FIG. 2 illustrates a state where the sheet S bends in the bending space 39 after the leading end of the sheet S collides with the pair of conveyance mechanisms 41 and 42.

Hereinafter, the sheet aligning mechanism will be described. As illustrated in FIG. 2, the sheet aligning mechanism 40 includes the pair of conveyance mechanisms 41 and 42, an aligning motor 43, and a control unit 70. The pair of conveyance mechanisms 41 and 42 are provided between the pair of conveyance rollers 71 and 72 and the printer unit 13 (see FIG. 1) in the conveyance direction Vs.

Figure 3:
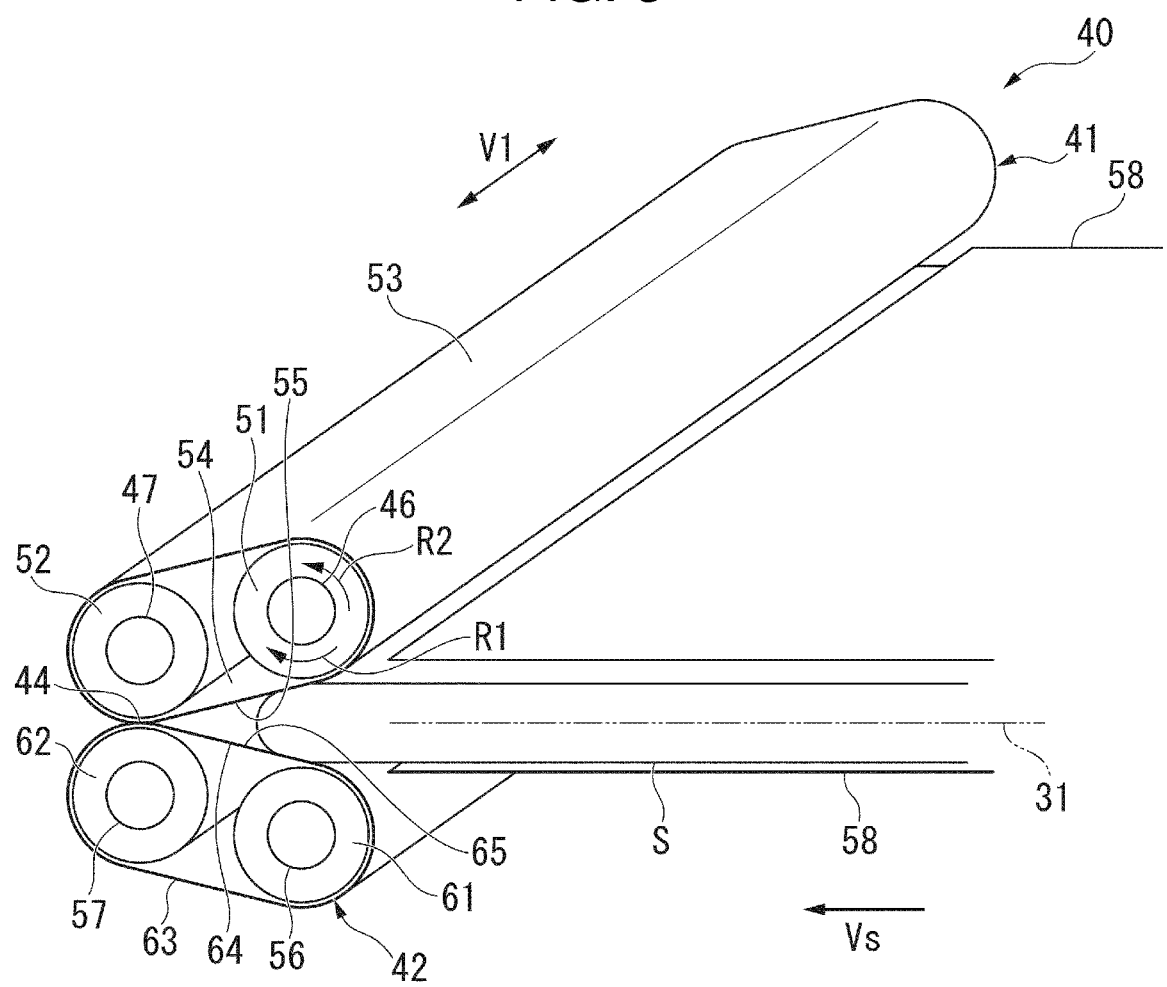
FIG. 3 illustrates a perspective view of the sheet aligning mechanism.
Figure 4:
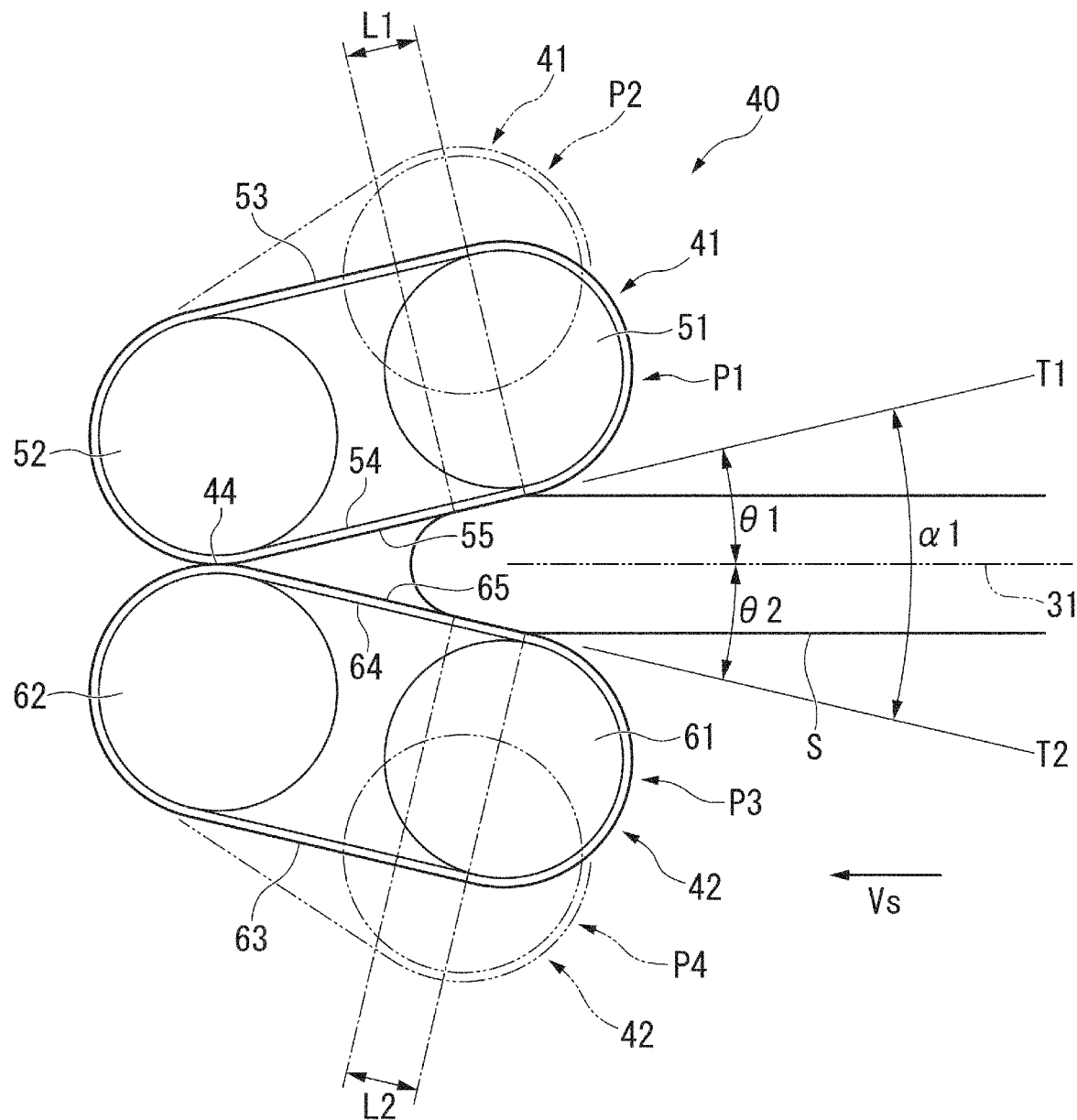
FIG. 4 illustrates an enlarged side view of the sheet aligning mechanism.

FIG. 3 illustrates a perspective view of the sheet aligning mechanism. FIG. 4 illustrates an enlarged side view of the sheet aligning mechanism. As illustrated in FIG. 3, the pair of conveyance mechanisms 41 and 42 include a first conveyance mechanism 41 and a second conveyance mechanism 42. The sheet aligning mechanism 40 aligns a position of the leading end of the sheet S by causing the sheet S conveyed along the conveyance path 31 to collide with the pair of conveyance mechanisms 41 and 42. The position of the leading end of the sheet S means a position of a downstream end of the sheet S in the conveyance direction Vs.

The first conveyance mechanism 41 includes a pair of support rollers 51 and 52 (first support rollers), and a first conveyance belt 53. The support roller 51 is provided on a rotary shaft 46. The support roller 51 extends in the conveyance perpendicular direction V1. The aligning motor 43 (see FIG. 2) rotates the support roller 51 by rotating the rotary shaft 46. The support roller 52 is provided on a rotary shaft 47. The rotary shaft 47 extends in parallel with the rotary shaft 46. The support roller 52 is provided on the downstream side of the conveyance direction Vs with respect to the support roller 51. The support roller 52 is spaced apart from the support roller 51. The support roller 52 is positioned such that the first conveyance belt 53 can contact a second conveyance belt 63. The support roller 52 is arranged in parallel with the support roller 51.

The first conveyance belt 53 is an endless belt. The first conveyance belt 53 is wound around the outer circumference of the support roller 51 and the outer circumference of the support roller 52. The first conveyance belt 53 faces the second conveyance belt 63 of the second conveyance mechanism 42. The first conveyance belt 53 is rotated according to the rotation of the support roller 51. The first conveyance belt 53 is made of rubber (ethylene propylene diene rubber, or the like), resin, or the like.

A first facing portion 54 is a portion of the first conveyance belt 53 that bridges between the support rollers 51 and 52. An outer surface of the first facing portion 54 is a first facing surface 55. The first facing surface 55 is planar and faces the conveyance path 31. The first facing surface 55 inclines in a direction to approach the conveyance path 31 toward the conveyance direction Vs. For example, an inclination angle θ1 (can be also referred to as approach angle) (see FIG. 4) of the first facing surface 55 with respect to the conveyance path 31 is greater than 0°. For example, the inclination angle θ1 is in a range of 10° to 45°. For example, the outer surface of the first conveyance belt 53 (for example, the first facing surface 55) contacts the sheet S when aligning, and aligns the position of the leading end of the sheet S.

As illustrated in FIG. 4, the first conveyance mechanism 41 may change its angle with respect to the conveyance path 31, i.e., the inclination angle θ1 of the first facing surface 55. For example, the first conveyance mechanism 41 may pivot about an axis line of a center axis of the support roller 52. For example, the first conveyance mechanism 41 pivots about the center axis of the support roller 52 as the axis line, such that the first conveyance mechanism 41 can be at a certain angle position between a first position P1 indicated by solid lines, and a second position P2 indicated by imaginary lines. The inclination angle of the first facing surface 55 in the second position P2 is larger than the inclination angle of the first facing surface 55 in the first position P1. The first conveyance mechanism 41 may be changed in its angle position by a driving unit (not illustrated) such as a motor.

As illustrated in FIG. 3, the second conveyance mechanism 42 is arranged to face the first conveyance mechanism 41. The second conveyance mechanism 42 nips the sheet S with the first conveyance mechanism 41 (specifically, the first conveyance belt 53) to convey the sheet. The second conveyance mechanism 42 includes a pair of support rollers 61 and 62 (second support rollers), and a second conveyance belt 63. The support roller 61 is provided on a rotary shaft 56. The support roller 61 extends in the conveyance perpendicular direction V1. The support roller 62 is provided on a rotary shaft 57. The rotary shaft 57 extends in parallel with the rotary shaft 56. The support roller 62 is provided on the downstream side of the conveyance direction Vs with respect to the support roller 61. The support roller 62 is spaced from the support roller 61. The support roller 62 arranges the second conveyance belt 63 to be able to contact the first conveyance belt 53. The support roller 62 is arranged in parallel with the support roller 61.

The second conveyance belt 63 is an endless belt. The second conveyance belt 63 is wound around the outer circumference of the support roller 61 and the outer circumference of the support roller 62. The second conveyance belt 63 faces the first conveyance belt 53 of the first conveyance mechanism 41. The second conveyance belt 63 is rotated according to the first conveyance belt 53. The second conveyance belt 63 is made of rubber (ethylene propylene diene rubber, or the like), resin, or the like.

A second facing portion 64 is a portion of the second conveyance belt 63 that extends between the support rollers 61 and 62. An outer surface of the second facing portion 64 is a second facing surface 65. The second facing surface 65 is planar and faces the conveyance path 31. The second facing surface 65 inclines in a direction to approach the conveyance path 31 toward the conveyance direction Vs. For example, an inclination angle θ2 (can be also referred to as approach angle) (see FIG. 4) of the second facing surface 65 with respect to the conveyance path 31 is greater than 0°. For example, the inclination angle θ2 is in a range of 10° to 45°. The second facing surface 65 faces the first facing surface 55. The outer surface of the second conveyance belt 63 (for example, the second facing surface 65) contacts the sheet S along with the outer surface of the first conveyance belt 53 when aligning, and aligns the position of the leading end of the sheet S.

The first conveyance belt 53 and the second conveyance belt 63 contact each other, thereby forming the nip 44. In the first conveyance mechanism 41 and the second conveyance mechanism 42, the sheet S is nipped between the first conveyance belt 53 and the second conveyance belt 63 to be conveyed.

As illustrated in FIG. 4, the second conveyance mechanism 42 may change its angle position, i.e., the inclination angle θ2 of the second facing surface 65. For example, the second conveyance mechanism 42 may pivot about a center axis of the support roller 62 as the axis line. For example, the second conveyance mechanism 42 pivots about the axis line of the center axis of the support roller 62, such that the second conveyance mechanism 42 can have a certain angle position between a first position P3 indicated by solid lines, and a second position P4 indicated by imaginary lines. The inclination angle of the second facing surface 65 in the second position P4 is larger than the inclination angle of the second facing surface 65 in the first position P3. The second conveyance mechanism 42 may be changed in its angle position by a driving unit (not illustrated) such as a motor.

Since the first conveyance mechanism 41 and the second conveyance mechanism 42 can change their angle positions as described above, the inclination angles θ1 and θ2 of the facing surfaces 55 and 65 can be adjusted according to thickness of the sheet S. For example, as the sheet S is thicker, the inclination angles θ1 and θ2 can be made larger.

The first conveyance mechanism 41 and the second conveyance mechanism 42 may change their angle positions independently from each other. Accordingly, the first conveyance mechanism 41 and the second conveyance mechanism 42 can adjust the inclination angles θ1 and θ2 independently from each other.

As illustrated in FIG. 2, the sheet S may bend in the bending space 39. In this case, the sheet S may incline with respect to the conveyance path 31 and may enter between the pair of conveyance mechanisms 41 and 42. The pair of conveyance mechanisms 41 and 42 can adjust the inclination angles θ1 and θ2 (see FIG. 4) of the facing surfaces 55 and 65 according to a bending shape of the sheet S in the bending space 39. For example, as illustrated in FIG. 4, the facing surfaces 55 and 65 may make one of the inclination angles θ1 and θ2 larger relatively to the other one. Specifically, when the sheet S bends toward the first conveyance mechanism 41, the sheet S may enter between the pair of conveyance mechanisms 41 and 42 diagonally from above in FIG. 4. Therefore, the inclination angle θ1 of the first facing surface 55 may be made larger in comparison to the inclination angle θ2 of the second facing surface 65. As a result, the sheet S can be more reliably introduced between the pair of conveyance mechanisms 41 and 42.

As illustrated in FIG. 3, the support roller 51 of the first conveyance mechanism 41 rotates in the clockwise direction (a direction indicated by the arrow R1 of FIG. 3) (forward rotation) when letting the sheet S advance toward the nip 44.

The first conveyance mechanism 41 stops or rotates in the counter clockwise direction (direction indicated by the arrow R2 of FIG. 3) (reverse rotation) when aligning, that is, when the sheet S collides with the pair of conveyance mechanisms 41 and 42.

The control unit 70 (see FIG. 2) may adjust the inclination angles θ1 and θ2 of the first facing surface 55 and the second facing surface 65 (see FIG. 4) by controlling a driving force of the driving unit. For example, when driving the pair of conveyance mechanisms 41 and 42 after aligning, the control unit 70 may change the angle positions of the pair of conveyance mechanisms 41 and 42, such that the inclination angles θ1 and θ2 are made smaller compared to those when aligning.

In the process of correcting the inclination of the sheet S when aligning, the sheet S may slip sideways in a state of being in contact with the conveyance belts 53 and 63. The sideslip means that the sheet S slips in the conveyance perpendicular direction V1. If the inclination angles θ1 and θ2 are relatively large when aligning, contact lengths (for example, contact lengths L1 and L2 of FIG. 4) of the sheet S with the facing surfaces 55 and 65 become shorter. Therefore, frictions between the sheet S and the facing surfaces 55 and 65 are reduced, and the sideslip is more likely to occur. Accordingly, the inclination of the sheet S is sufficiently corrected.

If the inclination angles θ1 and θ2 are made smaller after aligning, a contact angle of the sheet S with the facing surfaces 55 and 65 (for example, a contact angle α1 of FIG. 4) becomes smaller, and thus a conveying resistance when the pair of conveyance mechanisms 41 and 42 convey the sheet S is reduced. In addition, if the inclination angles θ1 and θ2 are made smaller, the contact lengths of the sheet S with the facing surfaces 55 and 65 become longer. Therefore, a conveyance force when the pair of conveyance mechanisms 41 and 42 convey the sheet S increases. Accordingly, when the pair of conveyance mechanisms 41 and 42 convey the sheet S after aligning, the sheet conveyance capability can be improved.

As illustrated in FIG. 2, the pair of conveyance rollers 71 and 72 are provided at a position on the upstream side of the sheet aligning mechanism 40 in the conveyance direction Vs. The pair of conveyance rollers 71 and 72 include a first conveyance roller 71 and a second conveyance roller 72 which face each other. The first conveyance roller 71 is driven by a motor 73. The second conveyance roller 72 is rotated according to the rotation of the first conveyance roller 71 (follow-up rotation). The pair of conveyance rollers 71 and 72 convey the sheet S toward the downstream side of the conveyance path 31.

A conveyance guide 58 illustrated in FIG. 3 guides the sheet S between the pair of conveyance mechanisms 41 and 42.

Hereinafter, a movement of a sheet in aligning will be described. First, aligning in a sheet aligning mechanism according to a comparative example will be described.

Figure 5:
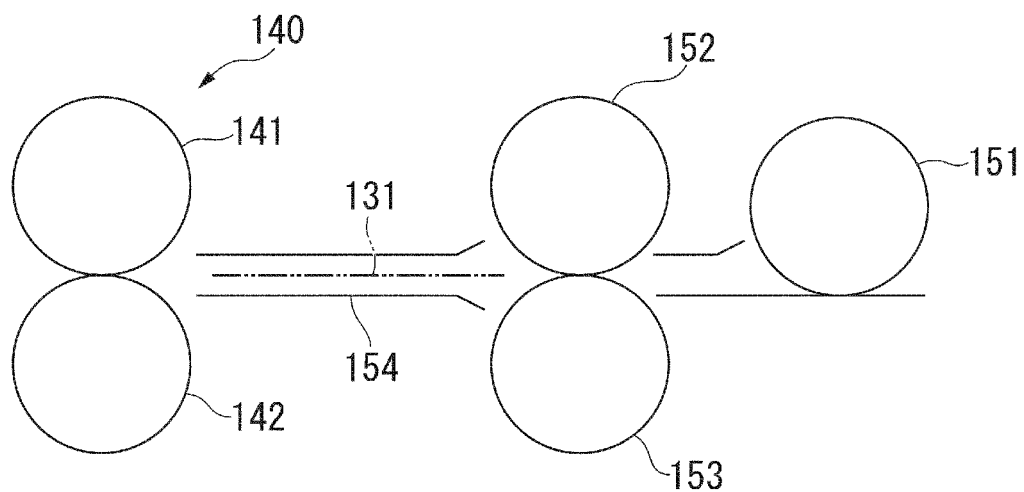
FIG. 5 illustrates a schematic side view of a part of a conveyance unit including a sheet aligning mechanism according to a comparative example.
Figure 6:
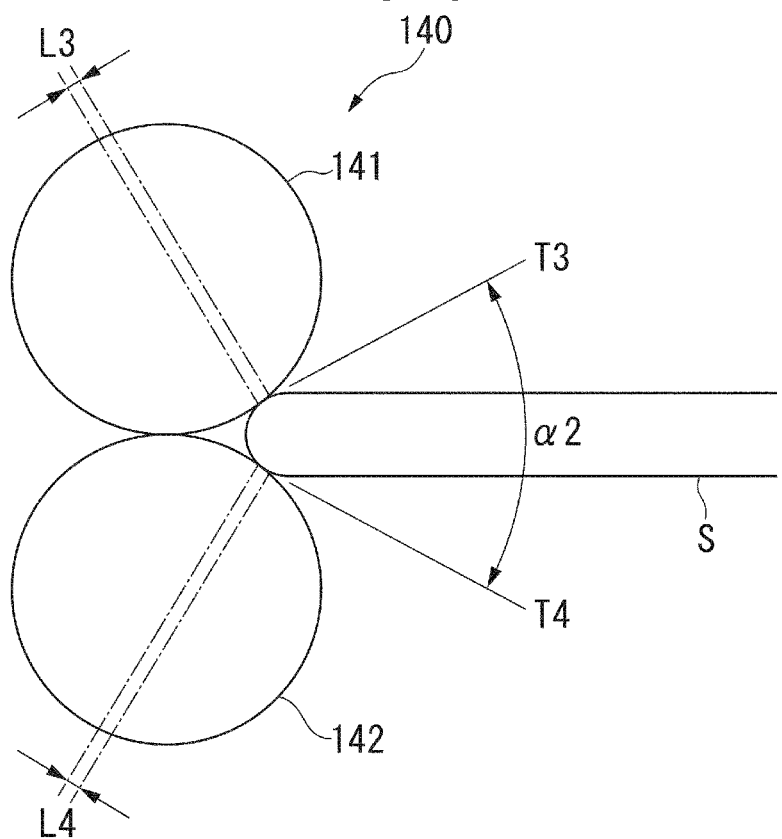
FIG. 6 illustrates an enlarged side view of the sheet aligning mechanism according to the comparative example.

FIG. 5 illustrates a schematic side view of a part of a conveyance unit including a sheet aligning mechanism according to a comparative example. FIG. 6 illustrates an enlarged side view of the sheet aligning mechanism according to the comparative example. As illustrated in FIG. 5, the sheet aligning mechanism 140 of the comparative example includes a pair of registration rollers 141 and 142, instead of the first conveyance mechanism 41 and the second conveyance mechanism 42, respectively (see FIG. 3). A pick-up roller 151 conveys a sheet in the paper feed unit 14 (see FIG. 1) to a paper feed roller 152. The paper feed roller 152 conveys the sheet to a conveyance path 131. A separation roller 153 returns a sheet unintendedly taken out to the paper feed unit 14 (see FIG. 1). An aligning guide 154 guides the sheet to the pair of registration rollers 141 and 142. In aligning, a leading end of the sheet collides with the pair of registration rollers 141 and 142. As a result, the pair of registration rollers 141 and 142 correct the inclination of the sheet.

As illustrated in FIG. 6, if the sheet S is thick, an angle a2 formed by tangential lines T3 and T4 from contact positions between the sheet S and the pair of registration rollers 141 and 142 increases. Therefore, a conveyance resistance when the pair or registration rollers 141 and 142 convey the sheet S increases. If the sheet S is thick, contact lengths L3 and L4 of the sheet S with the pair of registration rollers 141 and 142 become short. Therefore, a conveyance force when the pair of registration rollers 141 and 142 convey the sheet S is reduced. Accordingly, when the pair of registration rollers 141 and 142 convey the sheet S after aligning, the sheet conveyance capability may be insufficient.

Hereinafter, aligning in the sheet aligning mechanism according to an embodiment will be described.

As illustrated in FIG. 4, in aligning by using the sheet aligning mechanism 40 of an embodiment, the leading end of the sheet S contacts the facing surfaces 55 and 65 of the pair of conveyance mechanisms 41 and 42. In this case, the conveyance belts 53 and 63 may stop or may be reversely rotated. The leading end of the sheet S contacts the facing surfaces 55 and 65, such that the leading end of the sheet S is parallel with the conveyance perpendicular direction V1 (see FIG. 3). Accordingly, the conveyance belts 53 and 63 align the position of the leading end of the sheet S. That is, the inclination of the sheet S is corrected.

After aligning, the pair of conveyance mechanisms 41 and 42 are driven and the sheet S is conveyed in the conveyance direction Vs. Since the first conveyance mechanism. 41 and the second conveyance mechanism 42 include two support rollers, respectively, the first facing portion 54 and the second facing portion 64 include sufficient lengths. Accordingly, even if the sheet S is thick, the sheet S can contact the facing surfaces 55 and 65 of the conveyance belts 53 and 63. If the inclination angles θ1 and θ2 are small, the angle α1 (contact angle α1) formed by tangential lines T1 and T2 from contact positions between the sheet S and the pair of facing surfaces 55 and 65 is smaller in comparison to the contact angle α2 (see FIG. 6) in the comparative example. Accordingly, the conveyance resistance when the pair of conveyance mechanisms 41 and 42 conveys the sheet S is reduced. In addition, if the inclination angles θ1 and θ2 are small, the contact lengths L1 and L2 of the sheet S with the facing surfaces 55 and 65 become long. Therefore, the conveyance force when the pair of conveyance mechanisms 41 and 42 convey the sheet S increase . Accordingly, when the pair of conveyance mechanisms 41 and 42 convey the sheet S after aligning, the sheet conveyance capability can be improved. As a result, even if the sheet S is thick, a conveyance defect may not occur. In addition, if the sheet S is normal paper, a conveyance delay which may be caused by a conveyance slip can be suppressed.

Hereinafter, modifications will be described.

Figure 7:
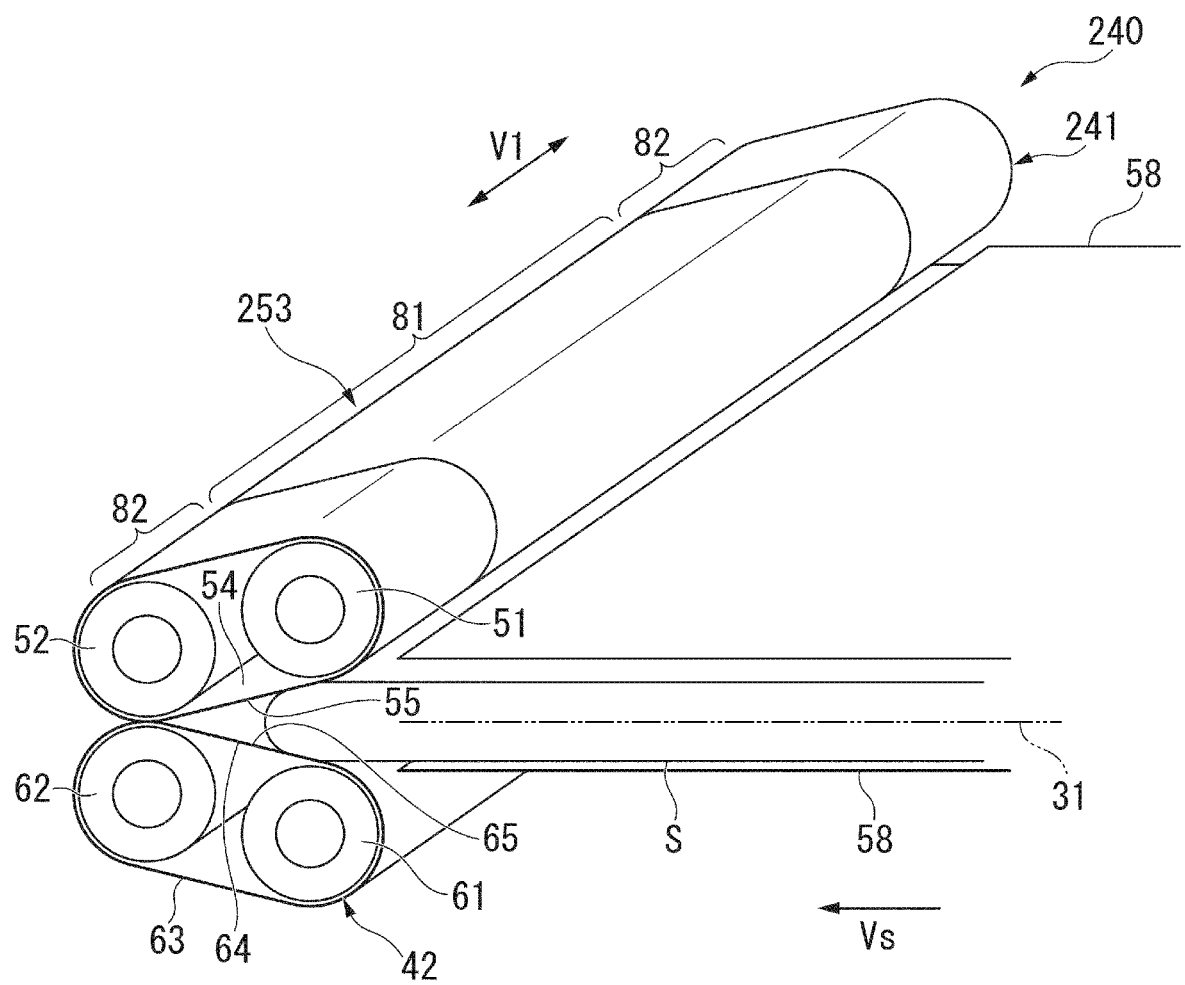
FIG. 7 illustrates a perspective view of a sheet aligning mechanism according to a first modification of the embodiment.

FIG. 7 illustrates a perspective view of a sheet aligning mechanism 240 according to a first modification of the embodiment. As illustrated in FIG. 7, the sheet aligning mechanism 240 differs from the sheet aligning mechanism 40 illustrated in FIG. 3 in that the sheet aligning mechanism 240 includes a first conveyance mechanism 241 instead of the first conveyance mechanism 41 (see FIG. 3).

The first conveyance mechanism 241 includes the support rollers 51 and 52, and a first conveyance belt 253. The first conveyance belt 253 includes a middle region 81 (first region) and end regions 82 and 82 (second regions). For example, the middle region 81 is a region that includes a middle portion of the first conveyance belt 253 in conveyance perpendicular direction V1. The middle region 81 is a belt-shaped region that stretches the full length of the first conveyance belt 253. The end regions 82 and 82 are regions that are disposed on end sides of the support rollers 51 and 52 with respect to the middle region 81. The end regions 82 and 82 are adjacent to one side and the other side of the middle region 81 in the conveyance perpendicular direction V1. The end regions 82 and 82 are belt-shaped regions stretching the full length of the first conveyance belt 253.

The outer surface of the middle region 81 has a first friction coefficient μ1 with respect to the sheet S in the conveyance direction Vs. The outer surfaces of the end regions 82 and 82 have a second friction coefficient μ2 with respect to the sheet S in the conveyance direction Vs. The second friction coefficient μ2 is lower than the first friction coefficient μ1. The friction coefficients μ1, μ2 are static friction coefficients or dynamic friction coefficients. A method of measuring the static friction coefficient and the dynamic friction coefficient is disclosed in ASTM D1894, for example.

The end (end in the conveyance perpendicular direction V1) of the sheet is more likely to contact the end regions 82 and 82 when aligning. When the inclination of the sheet S is corrected, the end of the sheet S may slip sideways in a state of being in contact with the conveyance belts 253 and 63.

Since the friction coefficient μ2 of the end regions 82 and 82 is lower than the friction coefficient μ1 of the middle region 81, the sideslip of the sheet S is more likely to occur in the sheet aligning mechanism 240. Accordingly, the inclination of the sheet S can be sufficiently corrected.

Figure 8:
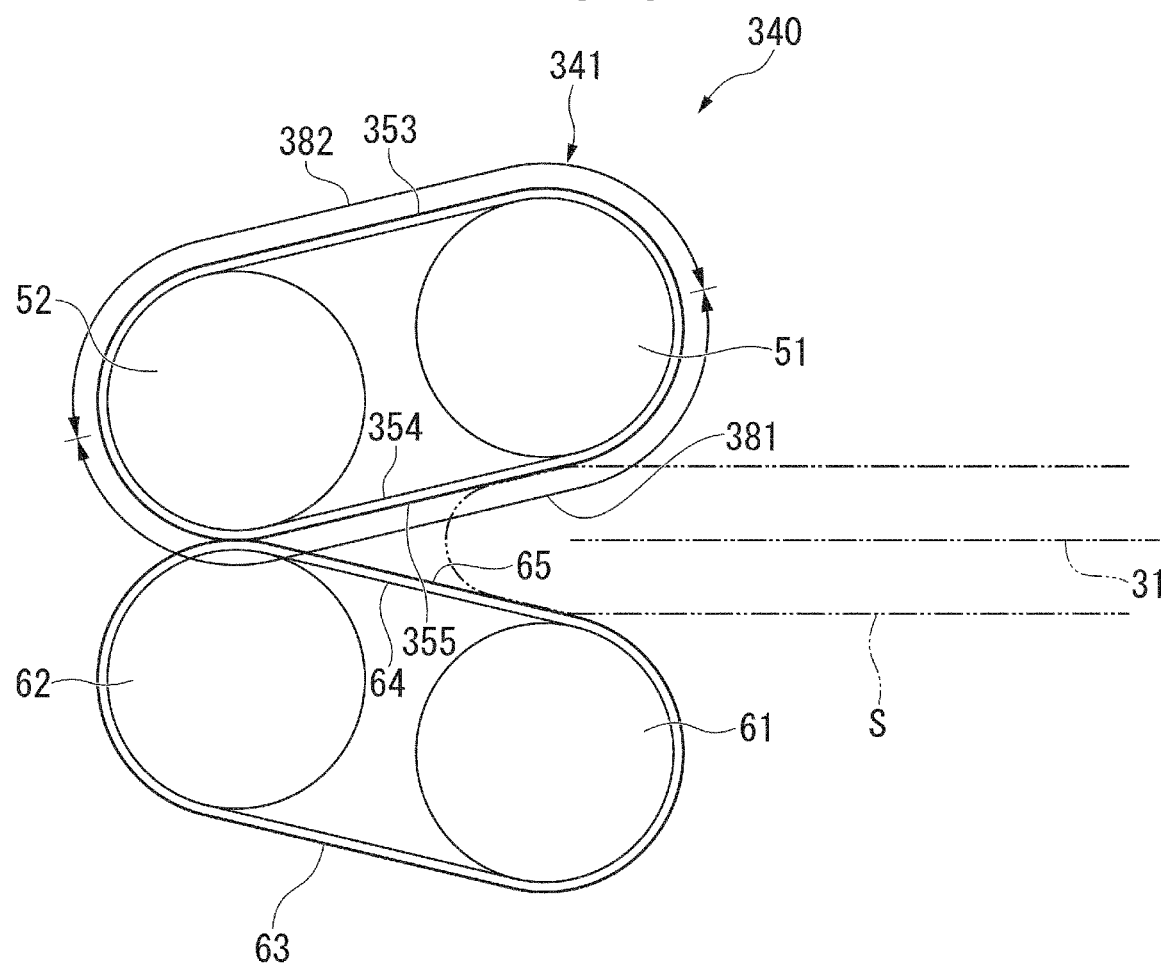
FIG. 8 illustrates a schematic side view of a sheet aligning mechanism according to a second modification of the embodiment.

FIG. 8 illustrates a schematic side view of a sheet aligning mechanism 340 according to a second modification of the embodiment. As illustrated in FIG. 8, the sheet aligning mechanism 340 differs from the sheet aligning mechanism 40 illustrated in FIG. 3 in that the sheet aligning mechanism 340 includes a first conveyance mechanism 341 instead of the first conveyance mechanism 41 (see FIG. 3).

The first conveyance mechanism 341 includes the support rollers 51 and 52, and a first conveyance belt 353. An outer surface of a first facing portion 354 of the first conveyance belt 353 is a first facing surface 355.

The first conveyance belt 353 includes a first region 381 and a second region 382 . The first region 381 and the second region 382 differ from each other in positions in the length direction (circumferential direction) of the first conveyance belt 353. The outer surface of the first region 381 has a first friction coefficient μ3 with respect to the sheet S in the conveyance direction Vs. The outer surface of the second region 382 has a second friction coefficient μ4 with respect to the sheet S in the conveyance direction Vs. The first friction coefficient μ3 and the second friction coefficient μ4 differ from each other. For example, the first friction coefficient μ3 is lower than the second friction coefficient μ4. The friction coefficients μ3, μ4 are static friction coefficients or dynamic friction coefficients.

The first conveyance belt 353 is arranged such that the sheet S contacts a region (for example, the first region 381) of the regions 381 and 382 that has a low friction coefficient when being aligned. For example, the first region 381 is arranged to face the conveyance path 31. Because of this arrangement, the sideslip of the sheet S is more likely to occur. Accordingly, the inclination of the sheet S can be sufficiently corrected. Since the first conveyance belt 353 includes the region of a high friction coefficient (for example, the second region 382), the conveyance force when the conveyance mechanisms 341 and 42 convey the sheet S after aligning is not reduced that much.

Although both the first conveyance mechanism 41 and the second conveyance mechanism. 42 in the sheet aligning mechanism 40 illustrated in FIG. 3 include the support rollers and the conveyance belts, respectively, the sheet aligning mechanism may be configured such that only one of the first conveyance mechanism and the second conveyance mechanism includes the support rollers and the conveyance belt.

Figure 9:
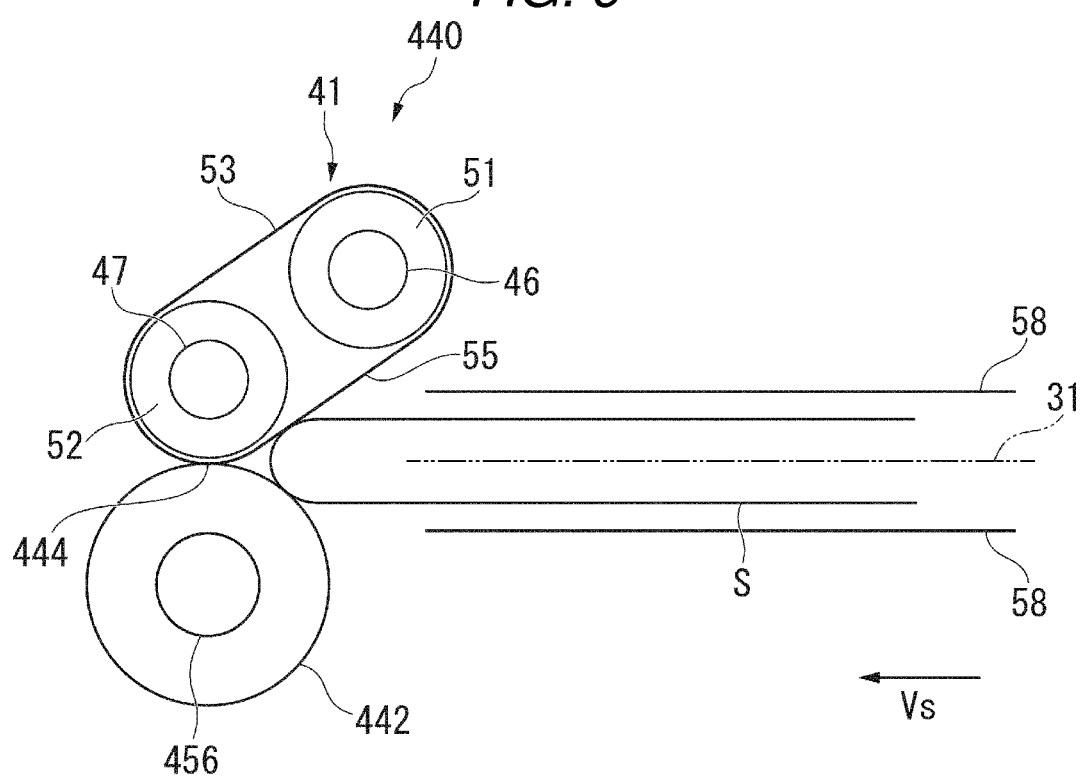
FIG. 9 illustrates a schematic side view of a sheet aligning mechanism according to a third modification of the embodiment.

FIG. 9 illustrates a schematic side view of a sheet aligning mechanism 440 according to a third modification of the embodiment. As illustrated in FIG. 9, the sheet aligning mechanism 440 differs from the sheet aligning mechanism 40 illustrated in FIG. 3 in that a conveyance roller 442 (second conveyance mechanism) is used instead of the second conveyance mechanism 42 (see FIG. 3). The conveyance roller 442 is arranged to face the first conveyance mechanism 41. The conveyance roller 442 is provided on a rotary shaft 456 which extends in parallel with the rotary shafts 46 and 47. The conveyance roller 442 extends in the conveyance perpendicular direction V1 (see FIG. 3). The first conveyance belt 53 and the conveyance roller 442 contact each other to form a nip 444. The conveyance roller 442 nips the sheet S with the first conveyance mechanism 41 (specifically, the first conveyance belt 53) to convey the sheet S. The conveyance roller 442 may be made of, for example, rubber, resin, metal, or the like. If the conveyance roller 442 is made of metal (stainless steel, aluminum, or the like), the ability to remove static electricity can be enhanced. The sheet aligning mechanism 440 has a simple structure, and thus can be miniaturized.

The installation position of the sheet aligning mechanism 40 illustrated in FIG. 2 is not limited to between the paper feed unit 14 and the printer unit 13 (see FIG. 1). The conveyance unit 30 (see FIG. 2) may be provided at any position of the conveyance path in the image forming system (image forming apparatus, post-processing apparatus).

The number of support rollers forming one conveyance mechanism is not limited to 2, and the number may be a certain number larger than or equal to 2. For example, the conveyance mechanism may include three or more support rollers arranged in parallel with one another, and a conveyance belt wound around the three or more support rollers.

According to at least one embodiment described above, the inclination angle of the first facing surface can be made small, and thus the contact angle between the sheet and the first facing surface can be made small. Therefore, the conveyance resistance when the first conveyance mechanism and the second conveyance mechanism convey the sheet can be reduced. Since the sheet aligning mechanism of the embodiment can make the inclination angle of the first facing surface small, the contact length of the sheet with the first facing surface increases. Therefore, the conveyance force when the first conveyance mechanism and the second conveyance mechanism convey the sheet increases. Accordingly, when the conveyance mechanism conveys the sheet after aligning, the sheet conveyance capability can be improved. As a result, even if the sheet is thick, a conveyance defect is less likely to occur. In addition, a conveyance delay which may be caused by a conveyance slip can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein maybe made without departing from the spirit of the inventions. The accompanying claims and their equivalents are intended to cover such forms or modifications as would fall within the scope and spirit of the inventions.

What is claimed is:

1. A sheet aligning mechanism comprising:
   a first conveyance mechanism disposed on a first side of a sheet conveyance path; and
   a second conveyance mechanism disposed on a second side of the sheet conveyance path opposite to the first side, a nip being formed between the first and second conveyance mechanisms,
   wherein the first conveyance mechanism includes a first roller, a second roller, and a first conveyance belt wound around the first and second rollers,
   the first and second rollers configured to rotate in a first direction along a sheet conveying direction for sheet conveyance, and stop rotation or rotate in a second direction opposite to the first direction for sheet alignment, and
   the first conveyance belt including an extended region between the first and second rollers in an extending direction inclined with respect to the sheet conveying direction, such that a width of the sheet conveyance path becomes narrower towards the nip in the sheet conveying direction, and
   wherein the second conveyance mechanism includes a third roller, a fourth roller, and a second conveyance belt wound around the third and fourth rollers,
   the third and fourth rollers configured to rotate in a third direction along the sheet conveying direction for the sheet conveyance, and stop rotation or rotate in a fourth direction opposite to the third direction for the sheet alignment, and
   the second conveyance belt including a second extended region between the third and fourth rollers in a second extending direction inclined with respect to the sheet conveying direction, such that the width of the sheet conveyance path becomes narrower towards the nip in the sheet conveying direction.

2. The sheet aligning mechanism according to claim 1, wherein the first conveyance mechanism is configured such that an angle between the extending direction and the sheet conveying direction is variable.

3. The sheet aligning mechanism according to claim 2, further comprising:
   a controller configured to control the first conveyance mechanism, such that the angle is at a first angle during the sheet alignment and then decreases to a second angle during the sheet conveyance.

4. The sheet aligning mechanism according to claim 3, wherein the first roller is disposed upstream with respect to the second roller in the sheet conveying direction, and movable around a rotational axis of the second roller to change the angle.

5. The sheet aligning mechanism according to claim 4, wherein the first roller is a driving roller and the second roller is a driven roller.

6. The sheet aligning mechanism according to claim 1, wherein the first conveyance mechanism is configured such that a first approach angle between the extending direction and the sheet conveying direction is variable, and the second conveyance mechanism is configured such that a second approach angle between the second extending direction and the sheet conveying direction is variable.

7. The sheet aligning mechanism according to claim 6, further comprising:

a controller configured to control the first conveyance mechanism, such that the first approach angle is at a first angle during the sheet alignment and then decreases to a second angle during the sheet conveyance, and control the second conveyance mechanism, such that the second approach angle is at a third angle during the sheet alignment and then decreases to a fourth angle during the sheet conveyance.

8. The sheet aligning mechanism according to claim 7, wherein the first approach angle and the second approach angle are independently variable.

9. The sheet aligning mechanism according to claim 1, wherein the first conveyance belt includes a first portion, and a second portion disposed between the first portion and an end of the first conveyance belt in a width direction and having a friction coefficient smaller than the first portion.

10. The sheet aligning mechanism according to claim 1, wherein the first conveyance belt includes a first portion having a first friction coefficient and a second portion having a second friction coefficient less than the first friction coefficient in a rotational direction thereof, wherein the first portion is positioned to correspond to the first extended region during the sheet alignment.

11. An image forming apparatus comprising:

an image forming device; and a sheet aligning mechanism configured to convey a sheet conveyed to or from the image forming device, the sheet aligning mechanism comprising:

a first conveyance mechanism disposed on a first side of a sheet conveyance path; and a second conveyance mechanism disposed on a second side of the sheet conveyance path opposite to the first side, a nip being formed between the first and second conveyance mechanisms, wherein the first conveyance mechanism includes a first roller, a second roller, and a first conveyance belt wound around the first and second rollers, the first and second rollers configured to rotate in a first direction along a sheet conveying direction for sheet conveyance, and stop rotation or rotate in a second direction opposite to the first direction for sheet alignment, and the first conveyance belt including an extended region between the first and second rollers in an extending direction inclined with respect to the sheet conveying direction, such that a width of the sheet conveyance path becomes narrower towards the nip in the sheet conveying direction, and wherein the second conveyance mechanism includes a third roller, a fourth roller, and a second conveyance belt wound around the third and fourth rollers, the third and fourth rollers configured to rotate in a third direction along the sheet conveying direction for the sheet conveyance, and stop rotation or rotate in a fourth direction opposite to the third direction for the sheet alignment, and the second conveyance belt including a second extended region between the third and fourth rollers in a second extending direction inclined with respect to the sheet conveying direction, such that the width of the sheet conveyance path becomes narrower towards the nip in the sheet conveying direction.

12. The image forming apparatus according to claim 11, wherein the sheet aligning mechanism is configured to convey a sheet conveyed to the image forming device.

13. The image forming apparatus according to claim 11, wherein the sheet aligning mechanism is configured to convey a sheet conveyed from the image forming device.

14. The image forming apparatus according to claim 11, wherein the first conveyance mechanism is configured such that a first approach angle between the extending direction and the sheet conveying direction is variable, and the second conveyance mechanism is configured such that a second approach angle between the second extending direction and the sheet conveying direction is variable.

15. The image forming apparatus according to claim 14, further comprising:

a controller configured to control the first conveyance mechanism, such that the first approach angle is at a first angle during the sheet alignment and then decreases to a second angle during the sheet conveyance, and control the second conveyance mechanism, such that the second approach angle is at a third angle during the sheet alignment and then decreases to a fourth angle during the sheet conveyance.

16. A sheet processing apparatus comprising:

a sheet processing device configured to carry out sheet processing on a printed sheet conveyed from an image forming apparatus; and a sheet aligning mechanism configured to convey a sheet conveyed to or from the sheet processing device, the sheet aligning mechanism comprising:

a first conveyance mechanism disposed on a first side of a sheet conveyance path; and a second conveyance mechanism disposed on a second side of the sheet conveyance path opposite to the first side, a nip being formed between the first and second conveyance mechanisms, wherein the first conveyance mechanism includes a first roller, a second roller, and a first conveyance belt wound around the first and second rollers, the first and second rollers configured to rotate in a first direction along a sheet conveying direction for sheet conveyance, and stop rotation or rotate in a second direction opposite to the first direction for sheet alignment, and the first conveyance belt including an extended region between the first and second rollers in an extending direction inclined with respect to the sheet conveying direction, such that a width of the sheet conveyance path becomes narrower towards the nip in the sheet conveying direction, and wherein the second conveyance mechanism includes a third roller, a fourth roller, and a second conveyance belt wound around the third and fourth rollers, the third and fourth rollers configured to rotate in a third direction along the sheet conveying direction for the sheet conveyance, and stop rotation or rotate in a fourth direction opposite to the third direction for the sheet alignment, and the second conveyance belt including a second extended region between the third and fourth rollers in a second extending direction inclined with respect to the sheet conveying direction, such that the width of the sheet conveyance path becomes narrower towards the nip in the sheet conveying direction.

17. The sheet processing apparatus according to claim 16, wherein the sheet aligning mechanism is configured to convey a sheet conveyed to the sheet processing device.

18. The sheet processing apparatus according to claim 16, wherein the sheet aligning mechanism is configured to convey a sheet conveyed from the sheet processing device.

19. The sheet processing apparatus according to claim 16, wherein
   the first conveyance mechanism is configured such that a first approach angle between the extending direction and the sheet conveying direction is variable, and
   the second conveyance mechanism is configured such that a second approach angle between the second extending direction and the sheet conveying direction is variable.

20. The sheet processing apparatus according to claim 19, further comprising:
   a controller configured to control the first conveyance mechanism, such that the first approach angle is at a first angle during the sheet alignment and then decreases to a second angle during the sheet conveyance, and control the second conveyance mechanism, such that the second approach angle is at a third angle during the sheet alignment and then decreases to a fourth angle during the sheet conveyance.

\* \* \* \* \*